United States Patent [19]
Hancock

[11] Patent Number: 5,377,555
[45] Date of Patent: Jan. 3, 1995

[54] STEERING COLUMN CLAMPING MECHANISM

[75] Inventor: Michael T. Hancock, Coventry, England

[73] Assignee: The Torrington Company, Torrington, Conn.

[21] Appl. No.: 156,480

[22] Filed: Nov. 23, 1993

[30] Foreign Application Priority Data

Dec. 2, 1992 [GB] United Kingdom ............... 9225232

[51] Int. Cl.⁶ .............................................. B62D 1/18
[52] U.S. Cl. ...................................... 74/493; 74/107; 74/527; 74/531; 74/569
[58] Field of Search ............... 74/107, 493, 567, 569, 74/527, 531; 192/93 A; 280/775

[56] References Cited

U.S. PATENT DOCUMENTS

| | | | |
|---|---|---|---|
| 1,041,010 | 10/1912 | Brownell | 192/93 A |
| 2,814,372 | 11/1957 | Hussa | 192/93 A X |
| 3,055,356 | 9/1962 | Chouinard | 74/569 X |
| 3,127,786 | 4/1964 | Wooley | 74/567 X |
| 3,238,797 | 3/1966 | Coughren | 74/567 X |
| 3,248,956 | 5/1966 | Kuhn | 74/569 X |
| 4,244,237 | 1/1981 | Sprunger | 74/493 |
| 4,788,880 | 12/1988 | Kester | 74/493 |
| 5,088,767 | 2/1992 | Hoblingre et al. | 280/775 |

FOREIGN PATENT DOCUMENTS

| | | |
|---|---|---|
| 2058511 | 6/1992 | Canada . |
| 0242928 | 10/1987 | European Pat. Off. . |
| 0493181 | 7/1992 | European Pat. Off. . |
| 2696404 | 4/1994 | France . |
| 3920783 | 8/1990 | Germany . |
| 1153225 | 5/1969 | United Kingdom . |
| 2113164 | 8/1983 | United Kingdom . |
| 2116496 | 9/1983 | United Kingdom . |
| 2240383 | 7/1991 | United Kingdom . |

Primary Examiner—Allan D. Herrmann
Attorney, Agent, or Firm—Michael H. Minns

[57] ABSTRACT

A rake and reach adjustable steering column is secured in its desired location by means of a clamping mechanism. The clamping mechanism includes a cam on camming surfaces on which rollers held in a body freely run. A bolt extends from the cam and roller arrangement through a mounting bracket for the steering column and through a member fixed to the steering column. The body is rotatable by a handle which, through the cam and roller arrangement, causes thrust washers and other parts to release and clamp the steering column in position.

6 Claims, 3 Drawing Sheets

STEERING COLUMN CLAMPING MECHANISM

BACKGROUND OF THE INVENTION

This invention relates to a steering column clamping mechanism for an adjustable steering column and more particularly to steering column clamping mechanisms for reach and rake adjustable steering columns.

A steering column clamping mechanism is known from U.S. Pat. No. 4,788,880 which clamps a housing of an adjustable steering column perpendicularly to the longitudinal direction of the steering column. That mechanism comprises a clamping bolt and a lever by which the bolt can be tensioned and the column housing fixed, there being a spring-loaded element between the housing and bolt with the lever and bolt being coupled by pins whose center lines cross that of the bolt when it is in a released condition. The pins are provided between a cup fixed to the bolt and the lever, the pins being longer than the distance, measured in the longitudinal direction, between the cup and lever in the released condition of the bolt, a limited degree of tilting of the pins on their supporting points being possible.

A disadvantage of known clamping mechanisms is that when the steering column in fixed, there is little feel of the degree of clamping. It is desirable that there is a point whereby the lever, when being moved toward its clamped or unclamped position, is just a little more difficult to move, thus indicating that the desired position has been reached. A second disadvantage of known clamping mechanisms is that there is no positive indication as the clamping mechanism moves from the clamped position to the unclamped position, that is, the point it changes from one position to the other position.

The foregoing illustrates limitations known to exist in present steering column clamping mechanisms. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a steering column clamping mechanism for use with an adjustable steering column, the mechanism having an unclamped condition allowing at least one of axial movement of the steering column or tilting movement of the steering column and having a clamped condition preventing movement of the steering column, the mechanism comprising: an actuating member having at least two roller members thereon; and a cam member in rolling engagement with the roller members, the cam member having at least two cam tracks with at least three zones, a first zone, a second zone anti a third zone, the third zone being between the first zone and the second zone, the first zone being lower than the second zone and the third zone being higher than second zone, the roller members being in engagement with the cam tracks, the first zone corresponding to the unclamped condition and the second zone corresponding to the clamped condition.

The foregoing and other aspects will become apparent from the following detailed description of the invention when considered in conjunction with the accompanying drawing figures.

BRIEF DESCRIPTION OF THE DRAWING FIGURES

Figure 6:
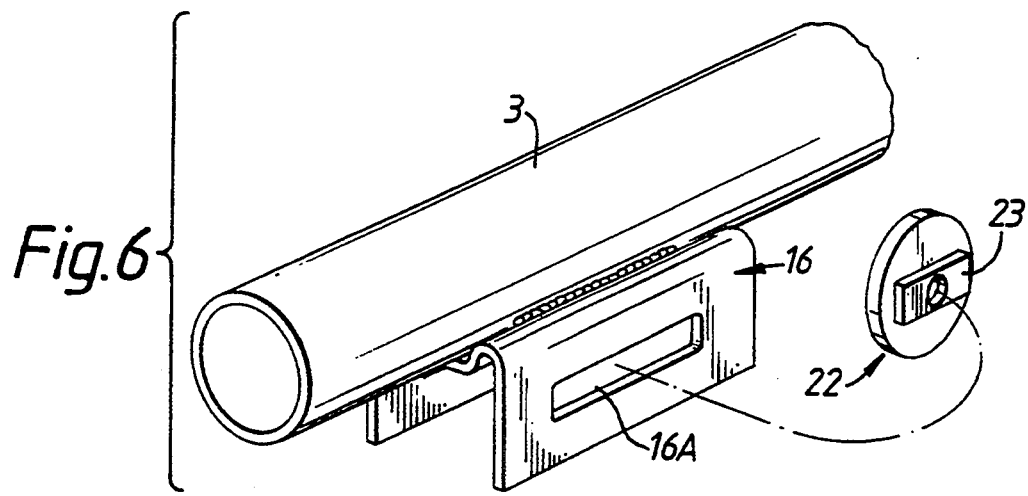
Figure 7:
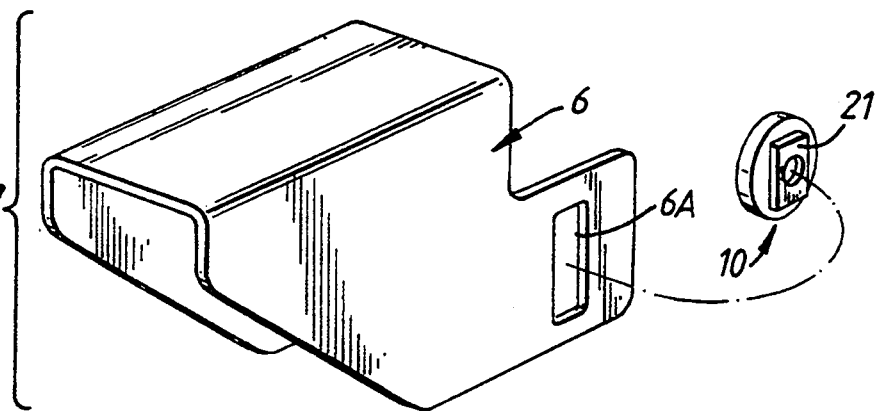

FIG. 6 is a diagrammatic exploded view of part of the clamping mechanism to illustrate how the steering column can be reach-adjustable, thrust washer 22 is shown in a reversed position for clarity; and FIG. 7 is a diagrammatic perspective view of a steering column mounting bracket and part of the clamping mechanism to illustrate how the steering column can be rake adjustable, cam 10 is shown in a reversed position for clarity.

DETAILED DESCRIPTION

According to the present invention, there is provided a steering column clamping mechanism for an adjustable steering column, the mechanism in use in an unclamped condition allowing movement of the column in an axial direction and/or tilting movement and in a clamped condition serving to prevent said movement, and the mechanism having an actuating member including a cam means to create said clamped and unclamped conditions.

The invention also extends to an adjustable steering column incorporating a clamping mechanism essentially as just defined.

The cam means preferably comprises a cam and roller arrangement.

The roller arrangement can include a body rotatable about an axis extending through a cam surface of the cam. The body of the roller arrangement can house at least two rollers which are arranged to run on portions of the cam surface. The cam surface is arranged to provide a low spot for the rollers, which is the unclamped condition of the mechanism, and a higher spot for the rollers, which provides the clamped condition of the mechanism. An even higher spot can be provided between the former two spots, thereby to provide an over-pressure run-in for the rollers to be urged by the cam into the position where the mechanism is in its clamped condition. The rollers can run freely on pins mounted in the body.

The body can be rotated by means of a handle.

In the preferred embodiment, a bolt is held in the body and extends co-axially with the axis of rotation of the body. The bolt passes through the cam and through a bracket serving to support the steering column on a mounting point and also through a member fixed to the steering column. The bolt also passes through parts which cause the member to be clamped relatively to the bracket when the clamping mechanism is in its clamped condition and to allow movement of the member relatively to the bracket when the mechanism is in its unclamped condition.

Figure 1:
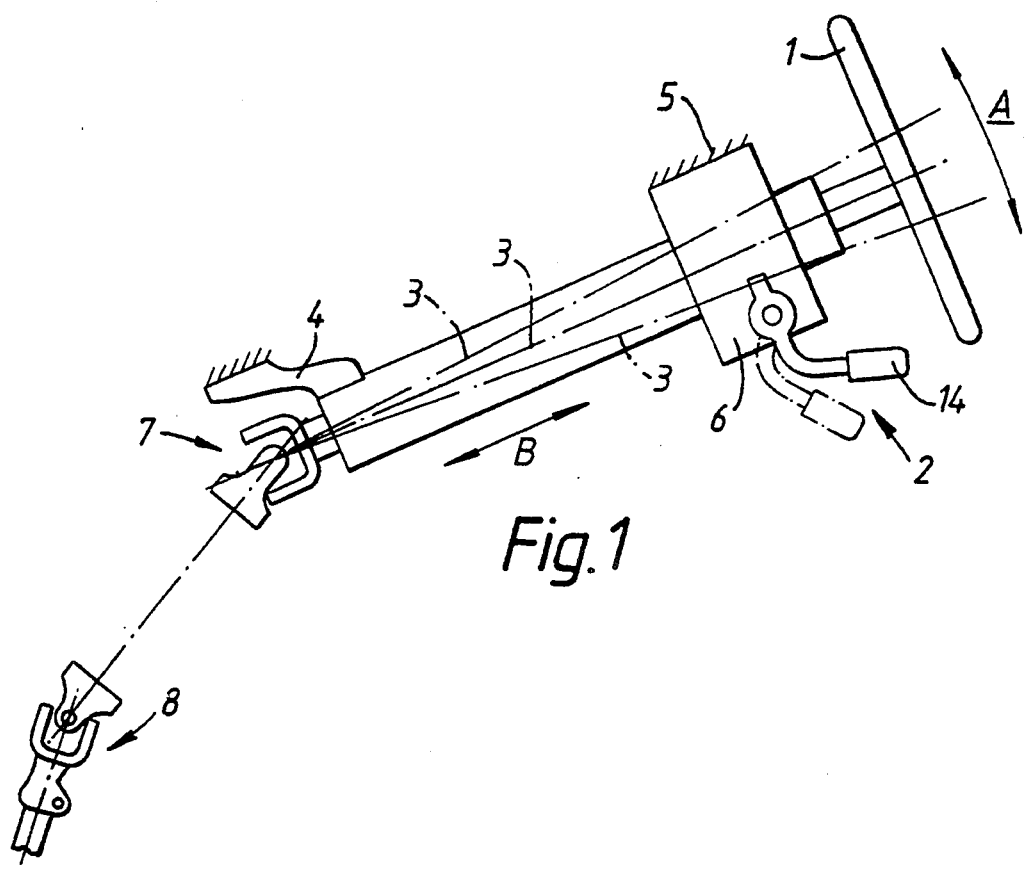
FIG. 1 is a diagrammatic side view of an adjustable steering column incorporating a clamping mechanism.

Referring to the drawings, FIG. 1 illustrates a rake and reach adjustable steering column, i.e. one in which a steering wheel 1 can be tilted in the directions of the double arrow A and/or adjusted parallel to the longitudinal axis of the steering column in the directions indicated by the double arrow B respectively. The steering column is held in its desired location by means of a clamping mechanism 2.

The steering column diagrammatically illustrated in FIG. 1 by reference numeral 3 (with other possible rake positions thereof) is mounted by means of steering column mounting points 4 and 5 in a vehicle. The steering column mounting point 5 includes a mounting bracket 6, which is also illustrated in FIGS. 2 and 7.

FIG. 1 also shows a steering column pivot point 7 about which the steering column and steering wheel are rake adjustable, and a steering box 8. A rake adjustable steering column is one which pivots about a point 7 which is remote from the clamping mechanism 2. A tilt adjustable steering column pivots about a point at or near the clamping mechanism.

Figure 2:
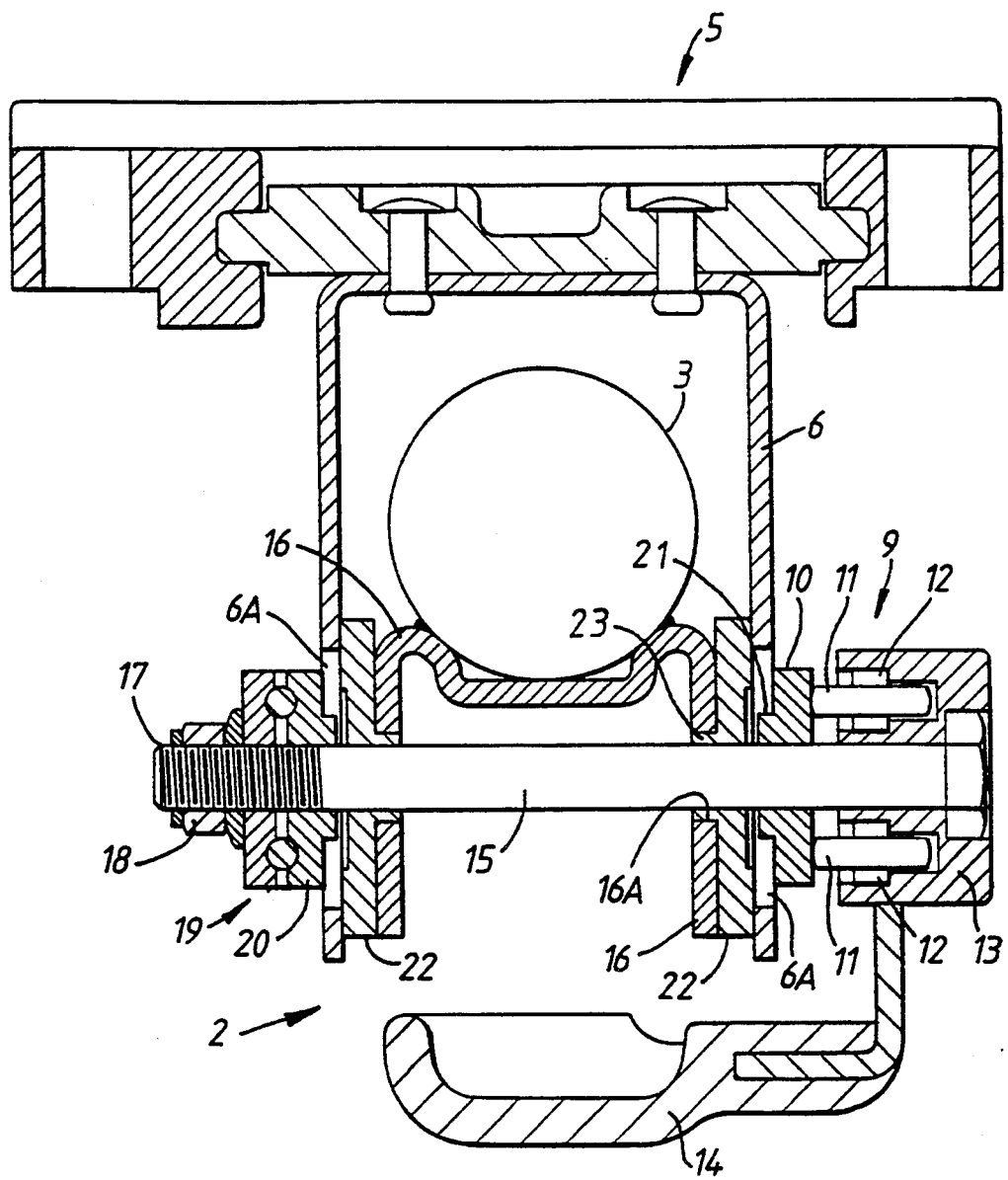
FIG. 2 is a diagrammatic sectional view showing the steering column with its clamping mechanism in more detail.

As best shown in FIG. 2, the steering column clamping mechanism 2 is formed around the mounting bracket 6 and includes a cam means 9 in the form of a cam and roller arrangement with a cam 10 and at least two rollers 11 freely running on axles 12 coaxially mounted in a body 13 which is rotatable about an axis at right angles to the axles 12. A handle 14 is connected to the body 13 to effect rotation thereof to move the clamping mechanism 2 between clamped and unclamped conditions. In FIG. 1, the handle 14 depicted in full lines indicates the clamped position, whereas the unclamped position is illustrated in dashed lines. A bolt 15 or other member is secured in the body 13 and extends co-axially with the axis of rotation of the body 13.

As shown in FIGS. 2 and 6, a saddle-like steering column retainer member 16 is welded to the underside of the steering column 3 and is provided with two longitudinal slots 16A, through which the bolt 15 passes, thereby allowing movement of the steering column 3 parallel to its axis about the bolt 15.

FIGS. 2 and 7 illustrate that the mounting bracket 6 is provided with two slots 6A, which extend at right angles to the slots 16A and through which the bolt 15 also passes. The slots 6A allow the tilting movement of the steering column 3 relative to the bracket 6 about the double arrow A in FIG. 1.

The bolt 15 or other member extends through the bracket 6 from the body 13 end of the clamping mechanism and ends in a screw-thread 17 with a nut 18 which tightens the mechanism to bring the rollers 11 into rolling contact with the cam 10. A roller bearing 19 is provided to allow rotation of the bolt 15 relative to a part 20. The part 20, which corresponds to the cam 10 on the opposite side of the bracket 6 (which is likewise constructed on the side concerned) has a rectangular protrusion 21 which fits in the slot 6A of the bracket 6 so that, when the mechanism is in its unclamped condition, the part 20 and the cam 10 can slide in their slots 6A for rake adjustment of the steering column.

A pair of thrust washers 22 are provided with a clearance fit about the bolt 15 adjacent respective internal faces of the mounting bracket 6 and each thrust washer 22 is provided with a rectangular protrusion 23 which is slidably mounted in the respective slots 16A of the saddle-like steering column retainer member 16. This latter construction allows for the movement of the steering column 3 in the direction of its axis when the clamping mechanism is in its unclamped condition for reach adjustment of the steering column.

Figure 3:
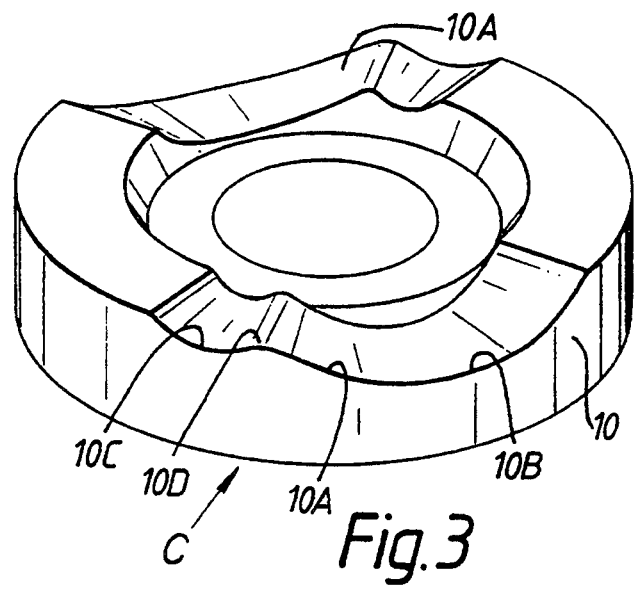
FIG. 3 is a diagrammatic perspective view of a cam of a cam means of the clamping mechanism.
Figure 4:
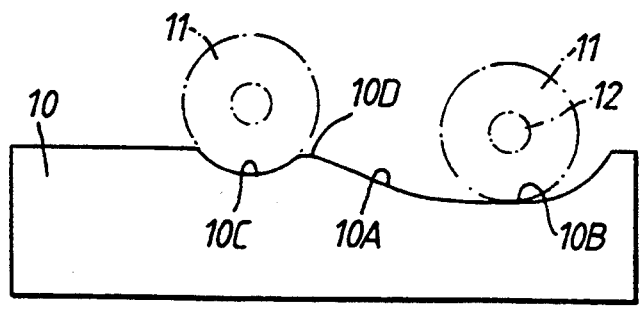
FIG. 4 is a diagrammatic view of the cam viewed in the direction of C in FIG. 3 and showing possible locations of a roller of the cam means.
Figure 5:
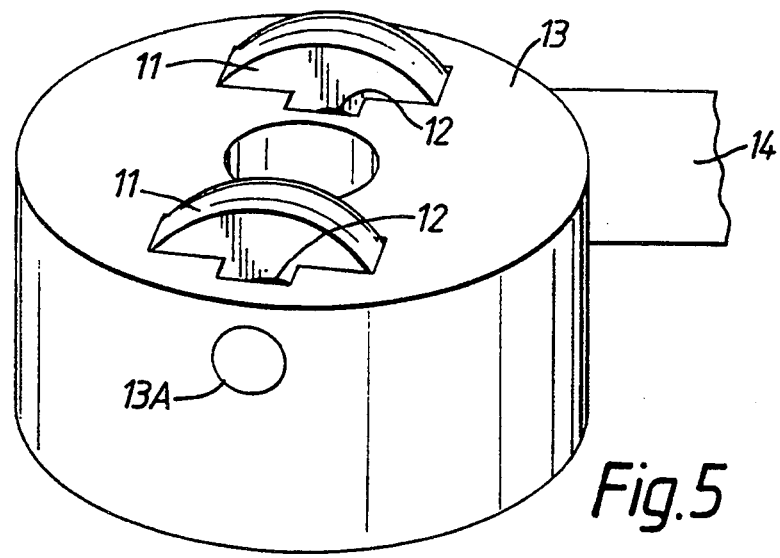
FIG. 5 is a diagrammatic perspective view of the assembled cam and roller arrangement.

FIGS. 3 to 5 show the cam and roller arrangement of the clamping mechanism and it will be seen that the cam 10 has cam surfaces 10A on one face of the cam, each providing for a respective roller 11 a low spot 10B for the clamping mechanism unclamped condition, a higher spot 10C for the clamping mechanism clamped condition and an even higher spot 10D over which each roller 11 has to run to reach the clamped condition, this higher spot 10D thereby providing means urging and serving to retain by force the rollers 11 seated in the spots 10C, 10B. Thus, a certain amount of resistance has to be overcome, using the handle 14, to rotate the body 13 and therefore the rollers 11 to bring the clamping mechanism into and out of the clamped condition. The sides of the bracket 6 and the member 16 have sufficient resilience to allow the rollers 11 to run over their high spots 10D.

It will be appreciated that the cam 10 and its cam surfaces 10A can be given any desired profile. Furthermore, any desired number of rollers 11 can be provided.

The rollers 11 themselves can be mounted as illustrated on individual axles 12 slotted in the body 13 or, for example, a single axle 12 can be inserted through the side of the body 13 through an aperture 13A (FIG. 5) in the side of the body 13, thereby mounting both rollers on a single axle.

When the clamping mechanism is in its clamped condition, the parts 10, 20 and 22 are pressed against the sides of the parts 6 and 16 as described hereinabove in order to prevent reach and rake adjustment of the steering column 3 and its steering wheel 1.

Having described the invention, what is claimed is:

1. A steering column clamping mechanism for use with an adjustable steering column, the mechanism having an unclamped condition allowing at least one of axial movement of the steering column or tilting movement of the steering column and having a clamped condition preventing movement of the steering column, the clamping mechanism comprising:

an actuating member having at least two rolling members thereon; and a cam member in rolling engagement with the rolling members, the cam member having at least two cam tracks with at least three zones, a first zone, a second zone and a third zone, the third zone being between the first zone and the second zone, the first zone being lower than the second zone and the third zone being higher than the second zone, the rolling members being in engagement with the cam tracks, the actuating member moving the rolling members from engagement with the first zone wherein the steering column is unclamped through engagement with the third zone and into engagement with the second zone wherein the steering column is clamped.

2. The steering column clamping mechanism according to claim 1, wherein the actuating member includes a body rotatable about an axis extending through the cam member.

3. The steering column clamping mechanism according to claim 2, wherein the rolling members travel in a circular path on the cam tracks, the axis of the circular path being the same as the body axis.

4. The steering column clamping mechanism according to claim 1, wherein the roller members run freely on pins mounted in the actuating member.

5. The steering column clamping according to claim 1, wherein the cam member moves away from the actuating member as the rolling members move from engagement with the first zone into engagement with the third zone and the cam member moves towards the actuating member as the rolling members move from engagement with the third zone and into engagement with the second zone.

6. The steering column clamping member according to claim 1, wherein the rolling members are rollers.

* * * * *

UNITED STATES PATENT AND TRADEMARK OFFICE
CERTIFICATE OF CORRECTION

PATENT NO. : 5,377,555
DATED : January 3, 1995
INVENTOR(S) : Michael Thomas Hancock It is certified that error appears in the above—identified patent and that said Letters Patent is hereby corrected as shown below:

In the Claims:

Claim 4, column 4, line 65, delete "1" and replace with --6--

Signed and Sealed this

Sixth Day of June, 1995

Attest:

BRUCE LEHMAN

Attesting Officer

Commissioner of Patents and Trademarks